(12) United States Patent
Bass et al.

(10) Patent No.: US 10,777,329 B2
(45) Date of Patent: Sep. 15, 2020

(54) METHODS AND APPARATUSES FOR PUMP SEALING DURING LEAKAGE EVENTS

(75) Inventors: John R. Bass, Wilmington, NC (US); Robert A. Ayer, Wilmington, NC (US); Robert J. Ginsberg, Wilmington, NC (US); Curt J. Robert, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 2403 days.

(21) Appl. No.: 13/340,675

(22) Filed: Dec. 30, 2011

(65) Prior Publication Data
US 2013/0170594 A1    Jul. 4, 2013

(51) Int. Cl.
*F04D 29/10* (2006.01)
*G21D 1/04* (2006.01)
(Continued)

(52) U.S. Cl.
CPC ........... *G21D 1/04* (2013.01); *F04D 15/0077* (2013.01); *F04D 29/106* (2013.01);
(Continued)

(58) Field of Classification Search
CPC .......... F04D 29/08; F04D 29/10; F04D 29/12; F04D 29/106; F04D 29/126;
(Continued)

(56) References Cited

U.S. PATENT DOCUMENTS 3,285,470 A    11/1966  Frei et al.
3,599,993 A *   8/1971  Eriksson ............... F16J 15/002
                                                          277/563
(Continued)

FOREIGN PATENT DOCUMENTS

JP    50-121694    9/1975
JP    01-103797    7/1989
(Continued)

OTHER PUBLICATIONS

Westinghouse, "Shield Passive Thermal Shutdown Seal for Reactor Coolant Pumps," Product Brochure, Apr. 2011, 2 pages.
(Continued)

*Primary Examiner* — Sharon M Davis
(74) *Attorney, Agent, or Firm* — Ryan Alley IP

(57) ABSTRACT

A pump leakage mitigation device includes one or more clamp arms on an outer surface of a pump that can be driven by a biasing element to seat against a shaft of the pump to seal or reduce fluid flow through a breakdown of the pump. The biasing element engages only at threshold temperatures, such as those associated with breakdown orifice failure when additional sealing may be necessary. Clamp arms of any number and shape can be used to achieve the desired seal and based on the pump geometry. A sealant surface and/or keeping mechanism are useable with the leakage mitigation device to enhance fluid flow blockage throughout a pump failure transient scenario. Pump leakage mitigation devices are installed on an outside of a variety of different pump types and can thus be installed, actuated, manipulated, disengaged, and/or removed without having to destroy or disassemble the pump.

20 Claims, 3 Drawing Sheets

(51) Int. Cl.
F04D 29/14 (2006.01)
F04D 15/00 (2006.01)
F16J 15/16 (2006.01)
F16J 15/00 (2006.01)
G21C 15/243 (2006.01)

(52) U.S. Cl.
CPC .......... *F04D 29/146* (2013.01); *F16J 15/008* (2013.01); *F16J 15/164* (2013.01); *G21C 15/243* (2013.01); *Y02E 30/40* (2013.01)

(58) Field of Classification Search
CPC ... F04D 29/146; F04D 15/0077; F16J 15/322; F16J 15/3212; F16J 15/34; F16J 15/3452; F16J 15/3488
USPC .......... 415/47, 231; 277/309, 359, 369, 630, 277/637, 931; 285/121.1, 121.4, 123.1
See application file for complete search history.

(56) References Cited

U.S. PATENT DOCUMENTS

| | | | | |
|---|---|---|---|---|
| 3,607,632 | A * | 9/1971 | Hansen et al. | 376/203 |
| 4,105,040 | A * | 8/1978 | Chester | 137/72 |
| 4,293,381 | A * | 10/1981 | Goetzmann et al. | 376/230 |
| 4,421,324 | A * | 12/1983 | Yamamoto | F16J 15/40 277/563 |
| 4,769,208 | A * | 9/1988 | Germer | 376/336 |
| 4,847,041 | A * | 7/1989 | Fornof | 376/308 |
| 5,171,024 | A * | 12/1992 | Janocko | 277/644 |
| 6,898,825 | B1 * | 5/2005 | Charest | 24/16 PB |
| 2003/0057655 | A1 * | 3/2003 | Chehab et al. | 277/500 |
| 2007/0140877 | A1 * | 6/2007 | Sanville et al. | 417/423.11 |
| 2007/0172367 | A1 * | 7/2007 | Janocko | 417/423.11 |
| 2010/0150715 | A1 * | 6/2010 | Howard et al. | 415/230 |

FOREIGN PATENT DOCUMENTS

| | | |
|---|---|---|
| JP | 03-092591 | 9/1991 |
| JP | 06-076691 | 10/1994 |
| JP | 11-202080 | 7/1999 |
| JP | 2012241724 A | 12/2012 |

OTHER PUBLICATIONS

English translation of Preliminary Rejection in corresponding Japanese Application 2013-254679, dated Nov. 4, 2014.
Office Action in corresponding Mexican Application MX/a/2012/014743, dated Mar. 3, 2016.
European Search Report and Opinion issued in connection with corresponding EP Application No. 12197449.7 dated Nov. 25, 2016.
Unofficial English Translation of Japanese Search Report issued in connection with corresponding JP Application No. 2012-271856 dated Nov. 30, 2016.

* cited by examiner

METHODS AND APPARATUSES FOR PUMP SEALING DURING LEAKAGE EVENTS

BACKGROUND

FIG. 1 is an illustration of a conventional light water reactor recirculation pump 10 used to drive coolant/moderator through a nuclear reactor. As shown in FIG. 1, pump 10 includes a shaft 11 that drives a centrifugal or other pump mechanism 19 to create a pressure head or fluid injection into a nuclear reactor. Conventional recirculation pump 10 includes a seal cartridge 12 through which shaft 11 extends. Seal cartridge 12 may generally separate shaft 11 into regions that are immersed in driven fluid, such as at pump mechanism 19, and regions that are dry and receive driving mechanical energy, such as a top portion of shaft 11. A breakdown orifice 13 where shaft 11 passes into seal cartridge 12 may generally prevent or substantially reduce migration of fluid from pump mechanism 19 up along shaft 11 and outside seal cartridge 12. In this way, conventional recirculation pump 10 may drive coolant/moderator through a reactor without loss of coolant/moderator through the pump.

As shown in FIG. 1, some conventional recirculation pumps 10 in pressurized water reactors may include one or more internal organic shutdown seals 15 that may be installed through disassembly of the pump. During non-use of pump 10, such as during maintenance periods or certain transient events like a station blackout, temperatures and pressure of a working fluid through pump mechanism 19 may cause breakdown orifice 13 to leak coolant/moderator. Internal organic shutdown seals 15 may include a separate thermal actuator that releases organic o-rings to permanently seal against and/or adhere to shaft 11 within seal cartridge 12 at a temperature associated with failure of breakdown orifice 13, thereby preventing or reducing leakage along shaft 11 and eventually breakdown orifice 13 caused by temperatures and pressure within the reactor. The organic o-ring may require replacement at time intervals associated with plant outages.

SUMMARY

Example embodiments include devices for reducing leakage of fluids through pump breakdown orifices and pumps using the same. Example embodiments are useable with pumps having a drive shaft passing into the pump through an orifice that may leak or otherwise fail at higher temperatures. Such pumps would include, for example, recirculation and emergency cooling pumps used in commercial nuclear reactors worldwide. Example embodiments include at least one clamp arm on an outer surface of the pump that can be driven by a force to seat against the shaft and block the breakdown orifice at temperatures where such sealing may be necessary. The force can be provided by any type of biasing element that actuates based on temperature, including a thermocouple-actuator pairing or bimetallic spring, for example. Single or several clamp arms may be used to achieve the desired seal and based on the pump geometry. For example, two clamps having semi-circular surfaces or a single cinch clamp may effectively seal a perimeter of a round pump shaft.

Because clamp arms are seated against a shaft at a breakdown orifice only at desired temperatures, example embodiments may be actuated at threshold temperatures associated with breakdown orifice failure, such as approximately 300-350 degrees Fahrenheit, for example, to engage and help mitigate fluid losses through breakdown orifices only in failure conditions. Further, because example embodiments may be deployed on external portions of pumps, example embodiments may be installed, accessed, and removed without having to destroy or disassemble the pump. Example embodiments may use radiation and temperature resilient materials that do not require replacement.

Example embodiments may include several additional features to enhance a seal and perform in desired manners. For example, a clamp arm can include a sealant surface like a gasket or adhesive that enhances contact between the arm and shaft/breakdown orifice and further reduces leakage. Example embodiments can also use keeping devices like ratchets, locks, etc. to maintain a clamp arm in a sealing position once actuated. If a passive biasing element like a bimetallic spring is used, keeping devices may maintain the enhanced breakdown orifice seal even after a pump starts to cool down. Additional elements are also useable exterior to the pump, such that they may be installed, disengaged, and/or removed without needing to disassemble the pump.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
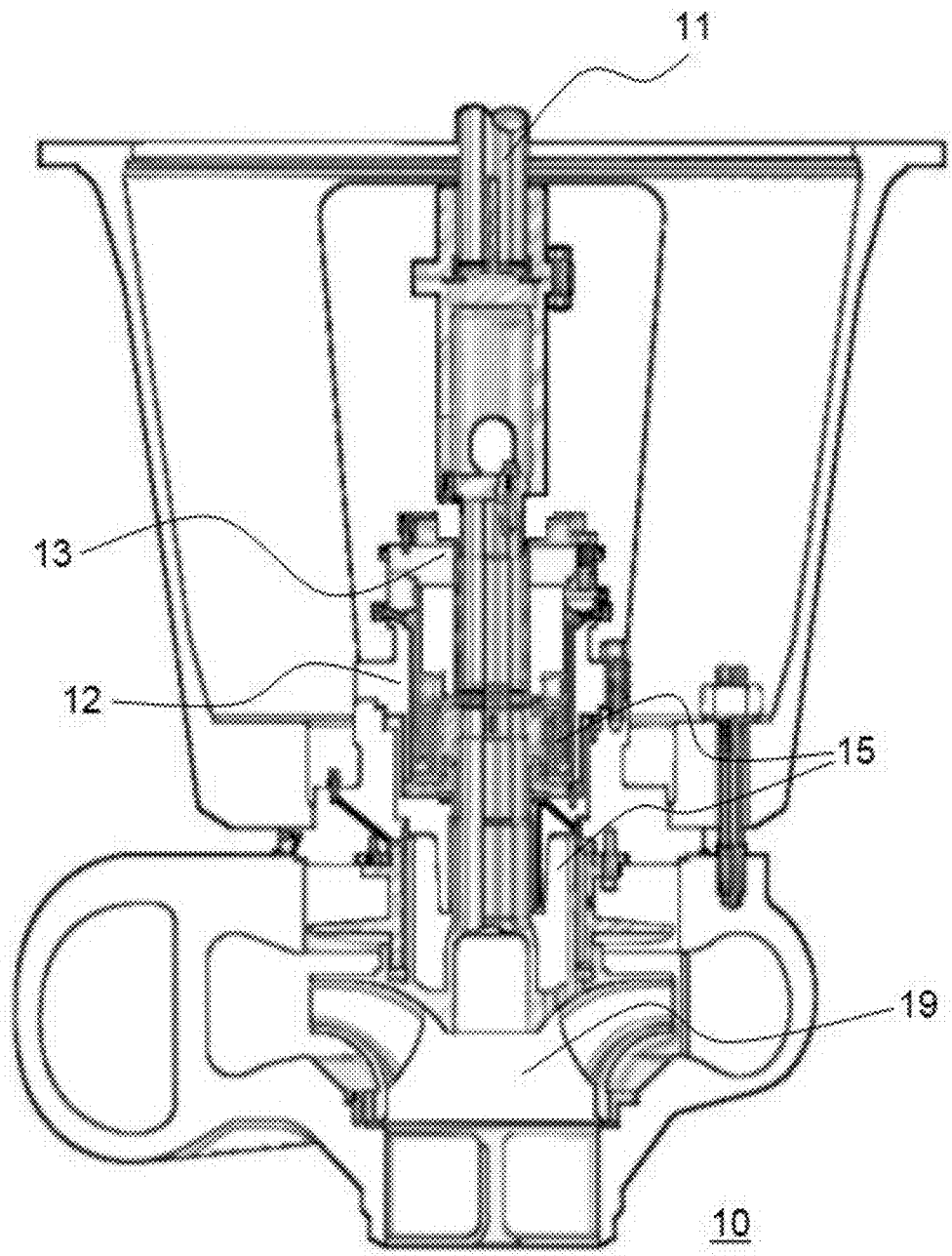
FIG. 1 is an illustration of a conventional recirculation pump useable in nuclear reactors.

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present so long as this does not destroy any functionality of the described features. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur or be present out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features or functionality described below, in any workable combination, falls within the scope of example embodiments.

Figure 2:
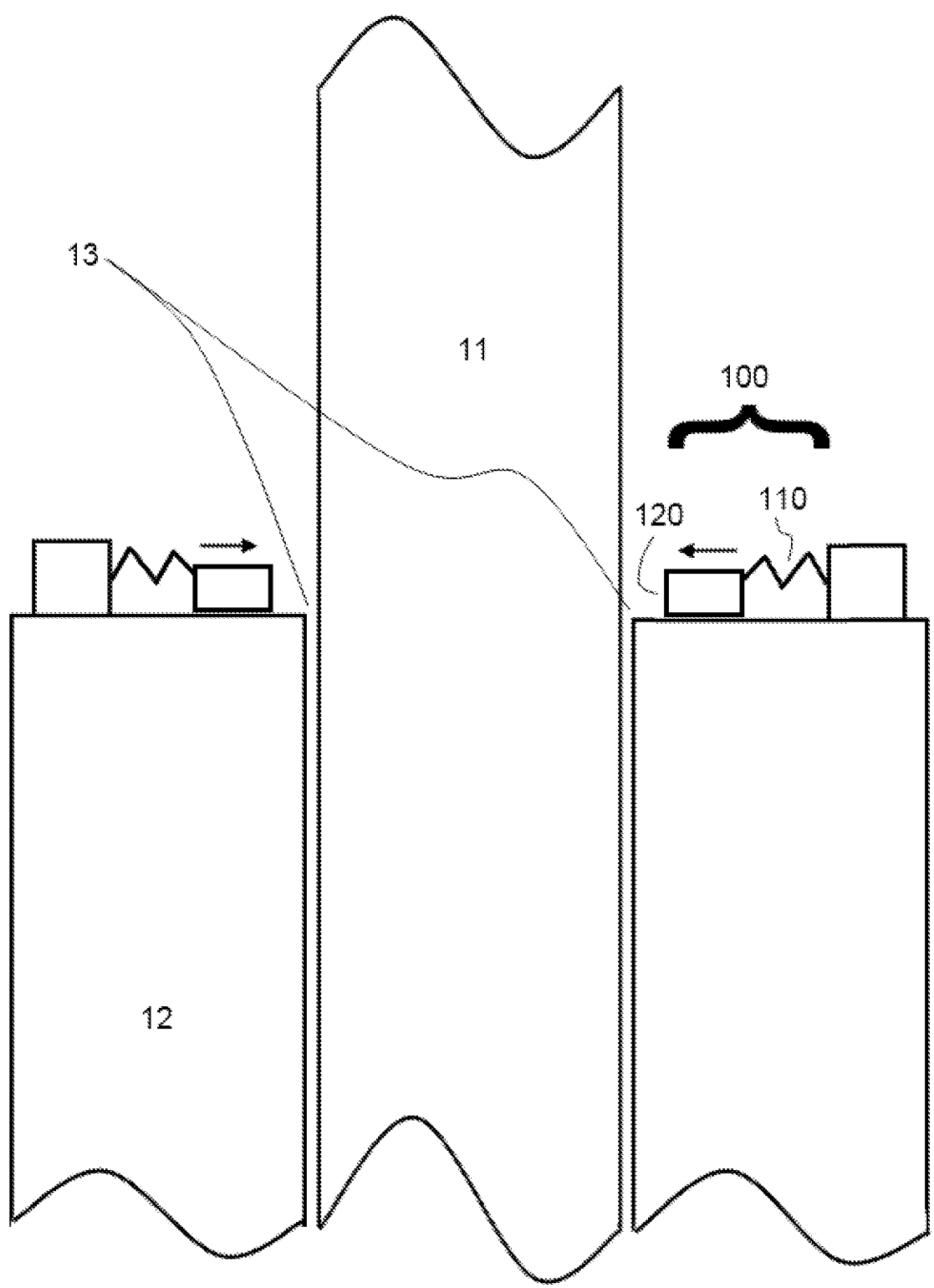
FIG. 2 is an illustration of a side view of an example embodiment recirculation pump seal.

FIG. 2 is an illustration of an example embodiment temperature-dependent breakdown orifice seal 100 installed about a breakdown orifice 13 of a pump. As shown in FIG. 2, example embodiment seal 100 includes temperature-sensitive biasing element 110 coupled to a sealing clamp 120. Both biasing element 110 and sealing clamp 120 are shaped and sized to be installed about a breakdown orifice 13 of a selected pump. For example, biasing element 110 may be connected between a support of seal cartridge 12 and sealing clamp 120, and sealing clamp 120 may be slidably installed on a top surface of seal cartridge 12 connected to biasing element 110. Or, for example, biasing element 110 may be connected between another nearby static structure and sealing clamp 120. Because example embodiment temperature-dependent breakdown orifice seal 100 is installed with sealing clamp 120 exterior to seal cartridge 12, such as about breakdown orifice 13, example embodiment seal 100 may be installed, accessed, removed, and/or manipulated without needing to disassemble or destroy seal cartridge 12 and/or a pump including the same.

Temperature-sensitive biasing element 110 is configured to bias sealing clamp 120 in a manner to seal or substantially block breakdown orifice 13 when a pump reaches a threshold temperature. The threshold temperature may be chosen to correspond to breakdown orifice 13 failure and/or leakage temperatures. For example, element 110 may be a bi-metallic spring that experiences thermal expansion at temperatures associated with overheat and likely failure of breakdown orifice 13. The thermal expansion may cause such a bimetallic spring to push sealing clamp 120 away from a relative static structure to which the spring is attached and toward shaft 11.

As a specific example, normal operating temperatures of seal cartridge 12 and thus example embodiment orifice seal 100 may be approximately 100-130 degrees Fahrenheit. During a loss of power event associated with loss of reactor cooling, temperatures may relatively quickly rise and approach 535 degrees Fahrenheit. In such an example, a bi-metallic spring useable for temperature-sensitive biasing element 110 may be chosen of materials that discriminately expand and thus bias clamp 120 at threshold temperatures above normal operating temperatures of 100-130 degrees Fahrenheit, for example, at around 250-300 degrees Fahrenheit. In this way, clamp 120 may not be biased at operating temperatures or minor overheat conditions but will be biased and remain biased at temperatures associated with lengthy transients causing failure and leakage through breakdown orifice 13. This may prevent clamp 120 from contacting shaft 11 during operation and thus prevent or reduce potential for damage from contact between a rotating shaft 11 and clamp 120.

Other threshold temperatures for temperature-sensitive biasing element 110 may be desired and achieved. If biasing element 110 is a bimetallic spring, for example, appropriate material selection and configuration may produce engagement at other threshold temperatures to account for differing steady-state operating temperatures and/or breakdown orifice 13 failure temperatures. Similarly, other types of temperature-sensitive biasing elements 110 are useable in example embodiments aside from bimetallic springs, including temperature-sensitive actuators or thermocouples and transducers, for example. Bi-metallic springs and similar mechanisms may offer an advantage of requiring no external power to operate, being fabricated of materials that are resilient against conditions found in operating nuclear plants, and/or being relatively easy to install on seal cartridges 12 of various types of pumps found in conventional nuclear power plants.

Figure 3:
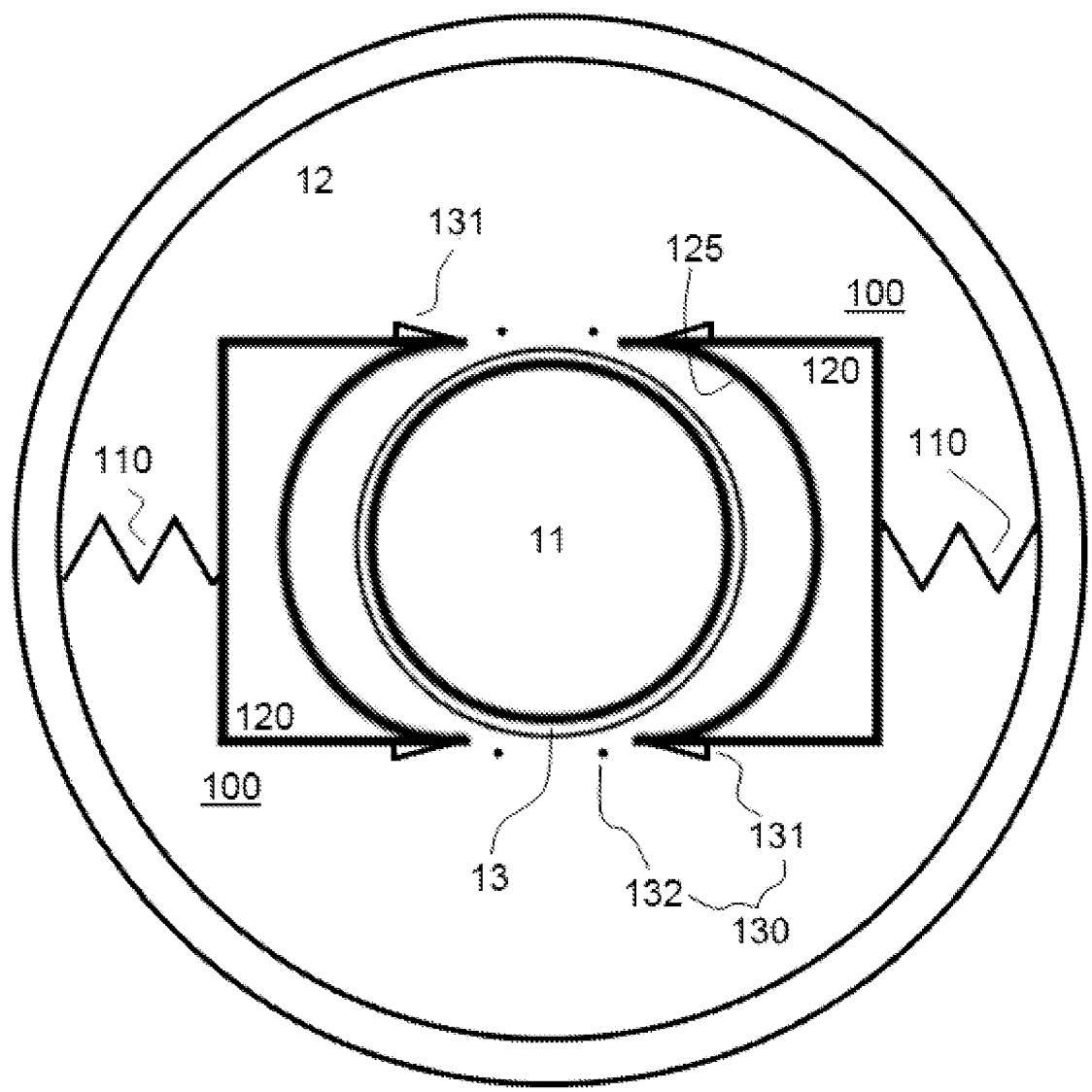
FIG. 3 is an illustration of a top view of an example embodiment recirculation pump seal.

Clamp 120 may take on several different configurations in order to successfully seal and/or reduce leakage through a failed breakdown orifice 13. As shown in FIG. 3, two example embodiment temperature-dependent breakdown orifice seals 100 may be installed on seal cartridge 12 on opposite sides of shaft 11 with crescent-shaped clamps 120 to seat against shaft 11. Alternatively, a single example embodiment orifice seal 100 may be used with a clamp 120 that may be a cinch clamp that seals an entire perimeter of shaft 11 about breakdown orifice 13. Any number of clamps 120 of various shapes and/or temperature-sensitive biasing elements 110 in any association with clamps 120 may be used to provide a desired geometry and achieve a degree of seal to breakdown orifice 13.

Clamp 120 and biasing element 110 may be fabricated of any material that substantially maintains its physical properties in an operating nuclear plant and successfully blocks or seals breakdown orifice 13 when engaged, including stainless steel, aluminum alloys, carbon steel, etc. If resilient materials are used, example embodiments may require little or no maintenance or replacement throughout the life of an associated pump. Similarly, clamp 120 and biasing element 110 may be chosen of a material that is compatible with, and does not foul, biasing element 110 and/or a surface of seal cartridge 12. As shown in FIG. 3, clamps 120 may include a sealant surface 125 that may act as a gasket to enhance a seal between clamps 120, shaft 11, and/or seal cartridge 12 about breakdown orifice 13. For example, sealant surface 125 may be a rubber, magnetic, plastic, and/or adhesive layer attached to a contact surface of clamp 120.

As shown in FIG. 3, example embodiment orifice seal 100 may further include a keeping device 130 that locks clamp 120 into a sealing position once temperature-sensitive biasing element 110 has actuated and biased clamp 120 to seal breakdown orifice 13. For example, keeping device 130 may include a ratchet surface 131 installed on clamp 120 and a corresponding ratchet keeper 132 installed on seal cartridge 12 or another relative surface. Ratchet keeper 132 and ratchet surface 131 may be relatively positioned to engage and lock only once clamp 120 has moved to a substantially-biased position against shaft 11, such as a position required to effectively seal or block over 90% of flow through breakdown orifice 13 in the case of a loss of reactor coolant or other leakage situations.

By locking example embodiment orifice seals 100 in an actuated position against shaft 11 and breakdown orifice 13, even if a pump begins to cool down and/or biasing element 110 fails after engagement, breakdown orifice 13 will remain substantially sealed by example embodiments and thus have reduced leakage post-failure and during cooldown. Ratchet keeper 132 may then be manually, automatically, or remotely released to disengage example embodiments if additional sealing of breakdown orifice 13 is no longer necessary. Such disengagement of example embodiments is possible without destroying or dismantling seal cartridge 12 or other pump components if external positioning is used for example embodiments.

Example embodiment temperature-dependent breakdown orifice seal 100 may be installed on any new or existing pump where leakage along shaft 11 and through breakdown orifice 13 is a risk in circumstances such as overheat and/or overpressure of a working fluid for the pump. Because example embodiments are functional on an exterior of seal cartridge 12, example embodiment temperature-dependent breakdown orifice seal 100 may be installed, removed, and/or locally disengaged at any time a pump having seal cartridge 12 is accessible. Example embodiment temperature-dependent breakdown orifice seal 100 may be installed in any number and clamp/biasing element configuration that meets breakdown orifice sealing needs.

Because example embodiment temperature-dependent breakdown orifice seals are capable of installation on an exterior of a seal cartridge 12, can be configured to selectively engage at desired temperatures, and/or are capable of non-destructive installation, engagement, disengagement, and removal, example embodiments may be relatively easily deployed to limit potential leakage through breakdown orifices of a variety of existing pumps in nuclear power plants in the instance of loss of reactor cooling and breakdown orifice 13 failure. For example, reactor recirculation pumps, Reactor Core Isolation Cooling (RCIC) pump or higher-output High Pressure Injection Cooling (HPIC) pump are all useable with example embodiments in boiling water reactors.

Example embodiments and methods thus being described, it will be appreciated by one skilled in the art that example embodiments may be varied and substituted through routine experimentation while still falling within the scope of the following claims. For example, although some example embodiments are described as passively engaging at desired temperatures, example embodiments are equally useable with temperature sensors that fairly directly measure temperature in pumps, such as thermocouples or thermal energy radiance monitors, and actuate at threshold temperatures. Further, it is understood that example embodiments and methods can be used in connection with any reactor where pumps may fail and leak during accident scenarios, such as a station blackout transient. Such variations are not to be regarded as departure from the scope of the following claims.

What is claimed is:

1. A leakage-mitigated pump comprising:
a shaft configured to rotate and provide mechanical power to the pump;
a seal cartridge forming a breakdown orifice through which the shaft passes into the seal cartridge;
a clamp arm on the seal cartridge about the shaft; and
a temperature-dependent biasing element connected to the clamp arm so as to bias the clamp arm toward the shaft at a threshold temperature, wherein the clamp arm and the temperature-dependent biasing element are on an exterior of the pump and are installable and accessible without any dismantling of the pump.

2. The pump of claim 1, further comprising:
a plurality of clamp arms on the exterior of the seal cartridge about the shaft.

3. The pump of claim 2, wherein,
the plurality of clamp arms includes the clamp arm and a corresponding clamp arm,
the clamp arm and the corresponding clamp arm are positioned on opposite sides of the shaft on the seal cartridge, and
the clamp arm and the corresponding clamp arm include surfaces that together seat against a perimeter of the shaft so as to seal the breakdown orifice.

4. The pump of claim 1, wherein the temperature-dependent biasing element is a bimetallic spring, and wherein the temperature-dependent biasing element and the clamp arm exert no force toward the shaft when below the threshold temperature.

5. The pump of claim 4, wherein the threshold temperature is approximately 300 degrees Fahrenheit.

6. The pump of claim 1, further comprising:
a sealant surface attached to the clamp arm, wherein the sealant surface is configured to adhere the clamp arms to the shaft and the seal cartridge.

7. The pump of claim 1, further comprising:
a keeping device configured to lock the clamp arm in a position sealing the breakdown orifice after the clamp arm has seated against the shaft.

8. The pump of claim 7, wherein the keeping device includes a ratchet surface on the clamp arm and a ratchet keeper stationary to the clamp arm and positioned to engage the ratchet surface.

9. The pump of claim 7, wherein the keeping device is configured to be released without dismantling the pump.

10. The pump of claim 7, wherein the keeping device is further configured to maintain the clamp arm in the position if the pump falls below the threshold temperature.

11. The pump of claim 1, wherein the pump is a reactor recirculation pump in a boiling water reactor-driven nuclear power plant.

12. The pump of claim 11, wherein the clamp arm and the biasing elements are fabricated of materials configured to substantially maintain their physical characteristics in an operating nuclear reactor environment.

13. The pump of claim 1, wherein the clamp arm and the biasing element are completely external to the breakdown orifice.

14. The pump of claim 13, wherein the clamp arm and the biasing element are metallic and without any organic material.

15. The pump of claim 14, wherein the biasing element is a bimetallic spring having a threshold temperature of approximately 350 degrees Fahrenheit, and wherein the bimetallic spring biases the clamp arm toward the shaft only when the seal cartridge is at or above the threshold temperature.

16. The pump of claim 13, wherein the breakdown orifice is an outermost opening from the pump, and wherein the clamp arm when biased seals against the shaft so as to prevent 90% of liquid coolant flow through the breakdown orifice.

17. The pump of claim 1, wherein the biasing element is at least one of a bimetallic spring, a temperature-sensitive actuator, a thermocouple and transducer, and a thermocouple and actuator.

18. The pump of claim 1, wherein the clamp arm is one of a cinch clamp and a pair of semi-circular surfaces surrounding the shaft.

19. The pump of claim 1, wherein the threshold temperature is a temperature of failure of the breakdown orifice.

20. The pump of claim 1, wherein, the clamp arm and the biasing element are both positioned entirely beyond the breakdown orifice along a length of the shaft, the biasing element is a bimetallic spring, and the threshold temperature is around 300 degrees Fahrenheit, the pump further comprising:
- a sealant surface on the clamp arm positioned to seal directly against the shaft and directly against the seal cartridge when the clamp arm is biased toward the shaft; and
- a keeping device configured to lock the clamp arm in a position sealing the breakdown orifice after the clamp arm has biased toward the shaft.

* * * * *